United States Patent
Jeyachandra et al.

(10) Patent No.: US 9,805,000 B1
(45) Date of Patent: Oct. 31, 2017

(54) METHOD AND APPARATUS FOR REORDERING MIXED RADIX FAST FOURIER TRANSFORM OUTPUTS

(71) Applicant: MBIT WIRELESS, INC., Newport Beach, CA (US)

(72) Inventors: Angelin Jeyachandra, Chennai (IN); Bhaskar Patel, San Clemente, CA (US)

(73) Assignee: MBIT WIRELESS, INC., Irvine, CA (US)

( * ) Notice: Subject to any disclaimer, the term of this patent is extended or adjusted under 35 U.S.C. 154(b) by 193 days.

(21) Appl. No.: 14/811,981

(22) Filed: Jul. 29, 2015

(51) Int. Cl.
*G06F 17/14* (2006.01)
(52) U.S. Cl.
CPC .................................. *G06F 17/142* (2013.01)
(58) Field of Classification Search
None
See application file for complete search history.

(56) References Cited

U.S. PATENT DOCUMENTS

| | | | | |
|---|---|---|---|---|
| 5,293,330 A * | 3/1994 | Sayegh | ................. | G06F 17/142 708/406 |
| 8,812,818 B2 * | 8/2014 | Barsness | ............. | G06F 12/1027 711/100 |
| 8,898,212 B2 * | 11/2014 | Chen | ..................... | G06F 17/142 708/400 |
| 2007/0288542 A1 * | 12/2007 | Shih | ....................... | G06F 17/142 708/404 |
| 2010/0106759 A1 * | 4/2010 | Chen | ..................... | G06F 17/142 708/404 |
| 2012/0254273 A1 * | 10/2012 | Asanaka | ............... | G06F 17/142 708/404 |

OTHER PUBLICATIONS

He, Shousheng, et al., "A New Approach to Pipeline FFT Processor," Proceedings of IPPS '96 (1996) pp. 766-770.

* cited by examiner

*Primary Examiner* — David H Malzahn
(74) *Attorney, Agent, or Firm* — Lerner, David, Littenberg, Krumholz & Mentlik, LLP (57) ABSTRACT

Fast Fourier Transform (FFT) operates by decomposing a longer length input signal into many smaller length signals. The decomposition may be carried out in different number of smaller length signals at each stage. The number of smaller length signals at each stage is referred to as a radix. FFT may be implemented either with decimation in time or with decimation in frequency method. Depending on the method used, reordering of the input or the output data sequence may be required in order to get the data sequence in the correct order. Mixed radix FFT is an FFT structure that uses a combination of radixes. The reordering for mixed radix FFT by bit reversing or digit reversing the index has non-trivial complexity. A method and apparatus are disclosed that enable efficient and zero latency reordering of a data sequence for an FFT structure that uses a combination of two or more radixes.

20 Claims, 13 Drawing Sheets

| Natuaral Order | | Shuffled Order | |
|---|---|---|---|
| Decimal | base-2 | Decimal | base-2 |
| 1 | 001 | 4 | 100 |
| 2 | 010 | 2 | 010 |
| 3 | 011 | 6 | 110 |
| 4 | 100 | 1 | 001 |
| 5 | 101 | 5 | 101 |
| 6 | 110 | 3 | 011 |
| 7 | 111 | 7 | 111 |

FIG. 3

| Natuaral Order | | Shuffled Order | |
|---|---|---|---|
| Decimal | 3-ary | Decimal | 3-ary |
| 0 | 00 | 0 | 00 |
| 1 | 01 | 3 | 10 |
| 2 | 02 | 6 | 20 |
| 3 | 10 | 1 | 01 |
| 4 | 11 | 4 | 11 |
| 5 | 12 | 7 | 21 |
| 6 | 20 | 2 | 02 |
| 7 | 21 | 5 | 12 |
| 8 | 22 | 8 | 22 |

| Index | Representation in Base-23 convention | Representation in Base-32 convention |
|---|---|---|
| 0 | 00 | 00 |
| 1 | 01 | 01 |
| 2 | 02 | 10 |
| 3 | 10 | 11 |
| 4 | 11 | 20 |
| 5 | 12 | 21 |

| Index (conv-1) | Stage-0 Radix 2 $D_2$ | Stage-1 Radix 3 $D_1$ | Stage-2 Radix 5 $D_0$ | Index (conv-2) | Stage-0 Radix 5 $D_2$ | Stage-1 Radix 3 $D_1$ | Stage-2 Radix 2 $D_0$ |
|---|---|---|---|---|---|---|---|
| 0 | 0 | 0 | 0 | 0 | 0 | 0 | 0 |
| 1 | 0 | 0 | 1 | 1 | 0 | 0 | 1 |
| 2 | 0 | 0 | 2 | 2 | 0 | 1 | 0 |
| 3 | 0 | 0 | 3 | 3 | 0 | 1 | 1 |
| 4 | 0 | 0 | 4 | 4 | 0 | 2 | 0 |
| 5 | 0 | 1 | 0 | 5 | 0 | 2 | 1 |
| 6 | 0 | 1 | 1 | 6 | 1 | 0 | 0 |
| 7 | 0 | 1 | 2 | 7 | 1 | 0 | 1 |
| 8 | 0 | 1 | 3 | 8 | 1 | 1 | 0 |
| 9 | 0 | 1 | 4 | 9 | 1 | 1 | 1 |
| 10 | 0 | 2 | 0 | 10 | 1 | 2 | 0 |
| 11 | 0 | 2 | 1 | 11 | 1 | 2 | 1 |
| 12 | 0 | 2 | 2 | 12 | 2 | 0 | 0 |
| 13 | 0 | 2 | 3 | 13 | 2 | 0 | 1 |
| 14 | 0 | 2 | 4 | 14 | 2 | 1 | 0 |
| 15 | 1 | 0 | 0 | 15 | 2 | 1 | 1 |
| 16 | 1 | 0 | 1 | 16 | 2 | 2 | 0 |
| 17 | 1 | 0 | 2 | 17 | 2 | 2 | 1 |
| 18 | 1 | 0 | 3 | 18 | 3 | 0 | 0 |
| 19 | 1 | 0 | 4 | 19 | 3 | 0 | 1 |
| 20 | 1 | 1 | 0 | 20 | 3 | 1 | 0 |
| 21 | 1 | 1 | 1 | 21 | 3 | 1 | 1 |
| 22 | 1 | 1 | 2 | 22 | 3 | 2 | 0 |
| 23 | 1 | 1 | 3 | 23 | 3 | 2 | 1 |
| 24 | 1 | 1 | 4 | 24 | 4 | 0 | 0 |
| 25 | 1 | 2 | 0 | 25 | 4 | 0 | 1 |
| 26 | 1 | 2 | 1 | 26 | 4 | 1 | 0 |
| 27 | 1 | 2 | 2 | 27 | 4 | 1 | 1 |
| 28 | 1 | 2 | 3 | 28 | 4 | 2 | 0 |
| 29 | 1 | 2 | 4 | 29 | 4 | 2 | 1 |

FIG. 10

| Normal index (base-235 convention) | | | | Digit reversed Index (base-532 convention) | | | |
|---|---|---|---|---|---|---|---|
| $D_2$ | $D_1$ | $D_0$ | Index | $D_2$ | $D_1$ | $D_0$ | Index |
| 0 | 0 | 0 | 0 | 0 | 0 | 0 | 0 |
| 0 | 0 | 1 | 1 | 1 | 0 | 0 | 6 |
| 0 | 0 | 2 | 2 | 2 | 0 | 0 | 12 |
| 0 | 0 | 3 | 3 | 3 | 0 | 0 | 18 |
| 0 | 0 | 4 | 4 | 4 | 0 | 0 | 24 |
| 0 | 1 | 0 | 5 | 0 | 1 | 0 | 2 |
| 0 | 1 | 1 | 6 | 1 | 1 | 0 | 8 |
| 0 | 1 | 2 | 7 | 2 | 1 | 0 | 14 |
| 0 | 1 | 3 | 8 | 3 | 1 | 0 | 20 |
| 0 | 1 | 4 | 9 | 4 | 1 | 0 | 26 |
| 0 | 2 | 0 | 10 | 0 | 2 | 0 | 4 |
| 0 | 2 | 1 | 11 | 1 | 2 | 0 | 10 |
| 0 | 2 | 2 | 12 | 2 | 2 | 0 | 16 |
| 0 | 2 | 3 | 13 | 3 | 2 | 0 | 22 |
| 0 | 2 | 4 | 14 | 4 | 2 | 0 | 28 |
| 1 | 0 | 0 | 15 | 0 | 0 | 1 | 1 |
| 1 | 0 | 1 | 16 | 1 | 0 | 1 | 7 |
| 1 | 0 | 2 | 17 | 2 | 0 | 1 | 13 |
| 1 | 0 | 3 | 18 | 3 | 0 | 1 | 19 |
| 1 | 0 | 4 | 19 | 4 | 0 | 1 | 25 |
| 1 | 1 | 0 | 20 | 0 | 1 | 1 | 3 |
| 1 | 1 | 1 | 21 | 1 | 1 | 1 | 9 |
| 1 | 1 | 2 | 22 | 2 | 1 | 1 | 15 |
| 1 | 1 | 3 | 23 | 3 | 1 | 1 | 21 |
| 1 | 1 | 4 | 24 | 4 | 1 | 1 | 27 |
| 1 | 2 | 0 | 25 | 0 | 2 | 1 | 5 |
| 1 | 2 | 1 | 26 | 1 | 2 | 1 | 11 |
| 1 | 2 | 2 | 27 | 2 | 2 | 1 | 17 |
| 1 | 2 | 3 | 28 | 3 | 2 | 1 | 23 |
| 1 | 2 | 4 | 29 | 4 | 2 | 1 | 29 |

FIG. 11

|        | Base-235 convention |       |       |
|--------|------|------|------|
| digit  | $D_2$ | $D_0$ | $D_1$ |
| base   | 2    | 3    | 5    |
| weight | 15   | 5    | 1    |

|        | Base-532 convention |       |       |
|--------|------|------|------|
| digit  | $D_2$ | $D_1$ | $D_0$ |
| base   | 5    | 3    | 2    |
| weight | 6    | 2    | 1    |

FIG. 12

| | Base-235 convention | | | | | |
|---|---|---|---|---|---|---|
| digit | $D_5$ | $D_4$ | $D_3$ | $D_2$ | $D_1$ | $D_0$ |
| base | 2 | 2 | 2 | 3 | 3 | 5 |
| weight | 180 | 90 | 45 | 15 | 5 | 1 |

| | Base-532 convention | | | | | |
|---|---|---|---|---|---|---|
| digit | $D_5$ | $D_4$ | $D_3$ | $D_2$ | $D_1$ | $D_0$ |
| base | 5 | 3 | 3 | 2 | 2 | 2 |
| weight | 72 | 24 | 8 | 4 | 2 | 1 |

FIG. 13

| digit | $D_5$ | $D_4$ | $D_3$ | $D_2$ | $D_1$ | $D_0$ |
|---|---|---|---|---|---|---|
| base | 2 | 2 | 2 | 3 | 3 | 5 |
| weight | 180 | 90 | 45 | 15 | 5 | 1 |
| digit value | 1 | 0 | 1 | 2 | 1 | 4 |
| weighted value | 180 | 0 | 45 | 30 | 5 | 4 |
| total | | | 264 | | | |

US 9,805,000 B1

METHOD AND APPARATUS FOR REORDERING MIXED RADIX FAST FOURIER TRANSFORM OUTPUTS

BACKGROUND

Figure 1:
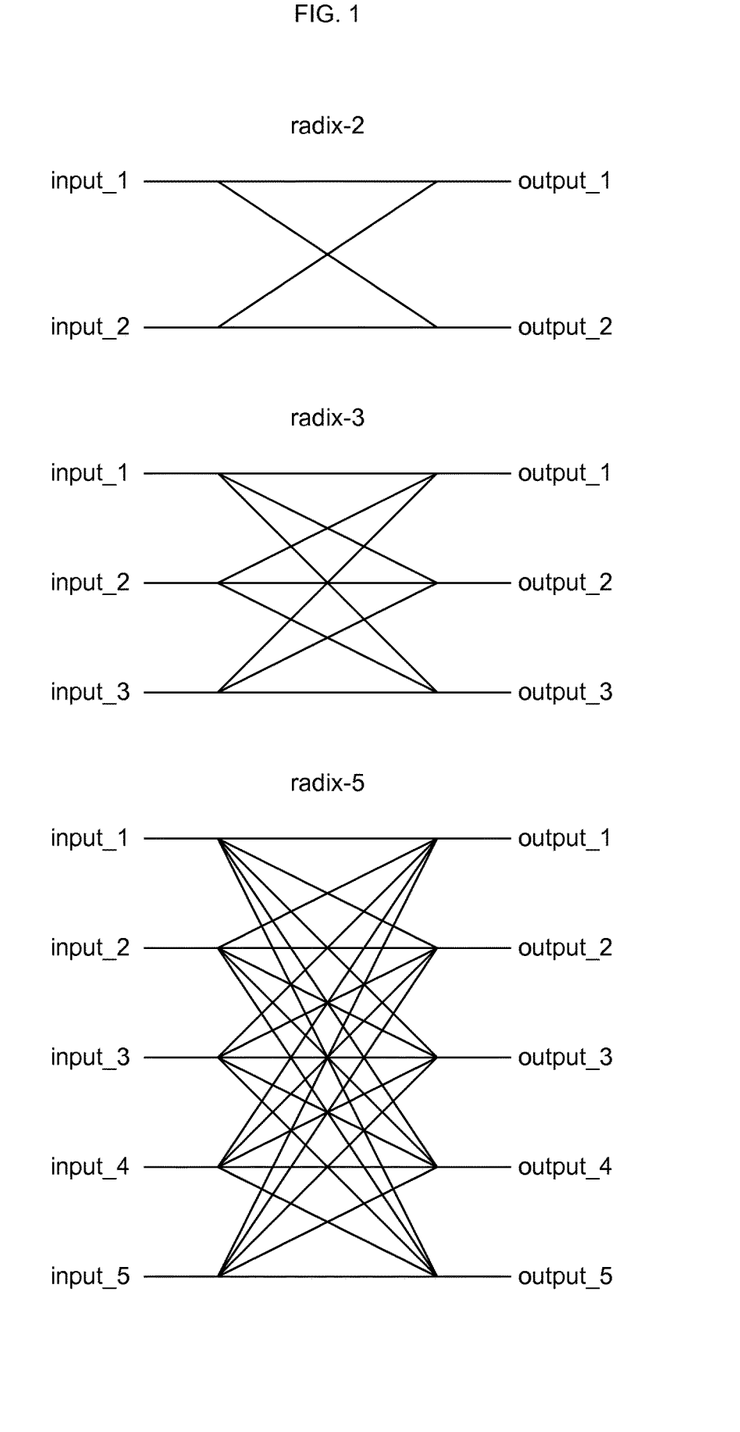
FIG. 1 illustrates example butterfly structures that may be used for FFT.

Fast Fourier Transform (FFT) is a fast method for computing Discrete Fourier Transform (DFT). FFT has many applications in digital signal processing, image processing, holography, spectrum estimation, fast convolution, Orthogonal Frequency Division Multiplexing (OFDM) based modulation and demodulation, etc. An FFT operates by decomposing a length N signal into many smaller length signals and then performing FFT on those smaller length signals. A length N signal is also referred to as an N-point signal herein. The decomposition process is then applied to the smaller length signals. This process is continued until the smallest length signal is reached. In case of a two-way decomposition, the smallest length is two and the particular method of two way decomposition is referred to as radix-2 FFT. If the decomposition is performed into three different smaller length signals, the process is referred to as radix-3 FFT. In general, any radix-r may be used for FFT but some radixes may have certain structural advantages in terms of implementation complexity or speed. At the final stage of decomposition, the Fourier transform of the smallest length signal corresponding to the radix size may be performed explicitly using the basic addition, subtraction, and multiplication operations in a structure commonly referred to as a butterfly. A butterfly may be radix-2, radix-3, etc. FIG. 1 shows examples of radix-2, radix-3 and radix-5 butterfly structures.

The suitability of a particular radix for FFT may depend on the length of the original signal. For example, if the original length N is a power of two such as 64, then FFT using radixes of smaller powers of two such as 2, 4, 8, etc., may offer the best complexity and performance tradeoff. In another example, if the original length N is a power of three such as 81, then FFT using radixes of smaller powers of three such as 3 or 9 may offer the best complexity and performance tradeoff.

In some cases the length N may be a composite number which cannot be represented as a power of a single number. For example, N=30 is a composite number with factors 2, 3, and 5. To perform FFT of signals whose lengths are composite numbers, use of mixed radix FFT structures may be required. For example, a 30-point FFT may be implemented as a cascade of radix-2, followed by radix-3 and finally followed by radix-5 structure. Another method for 30-point FFT may be implemented as a cascade of radix-5, radix-3, and radix-2 structures. In general, any order of the radix structures may be used but depending on the specific value of the original length N a particular order may be beneficial in terms of complexity and performance tradeoffs.

When converting a signal from frequency domain to time domain, the process is referred to as inverse DFT. The process of converting a time domain signal into frequency domain is simply referred to as DFT. In general, the DFT and the inverse DFT processing is identical except for the sign of the exponent of the kernel term. In the present disclosure, the term FFT is used to refer to fast computation of both DFT and inverse DFT.

Figure 2:
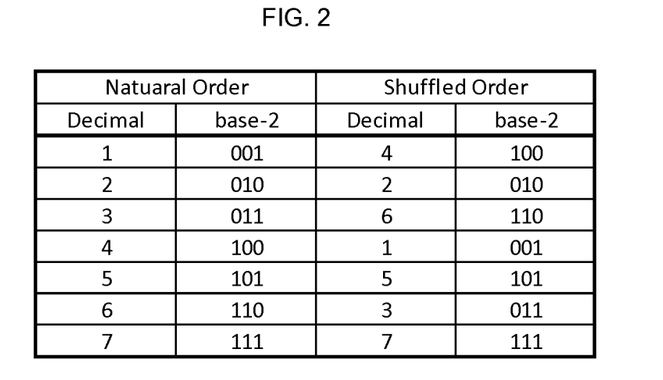
FIG. 2 illustrates reordering for an 8-point FFT using three stages of radix-2 butterflies.

The FFT algorithm may be implemented either with Decimation-In-Time (DIT) or with Decimation-In-Frequency (DIF) method. Often the FFT computations are done "in-place" where the input memory and the output memory after each butterfly operation is the same. Because of the reduced memory usage, the in-place computation method is preferred for implementation. However, the in-place computation leads to either output signal not in its natural order or requiring the input signal not in its natural order. A signal that is not in its natural order is referred to as a shuffled signal herein. Depending on whether the DIT or DIF method is used, reordering of the input or the output signal may need to be done to get it in the correct natural order. In case of radix-2 FFT the reordering amounts to a simple bit-reversal. For example, in case of an 8-point signal, the index of a data point within a signal may be represented as three bit sequence $b_0 b_1 b_2$. The bit reversed index of the same data point may be represented as $b_2 b_1 b_0$. The bit-reversal operation may be straightforward to implement with very low complexity in hardware structures but may have non-negligible complexity and delay in software implementations, especially for large N. FIG. 2 shows the natural order and bit reversed order for an 8-point signal when the FFT is performed using three radix-2 stages.

Figure 3:
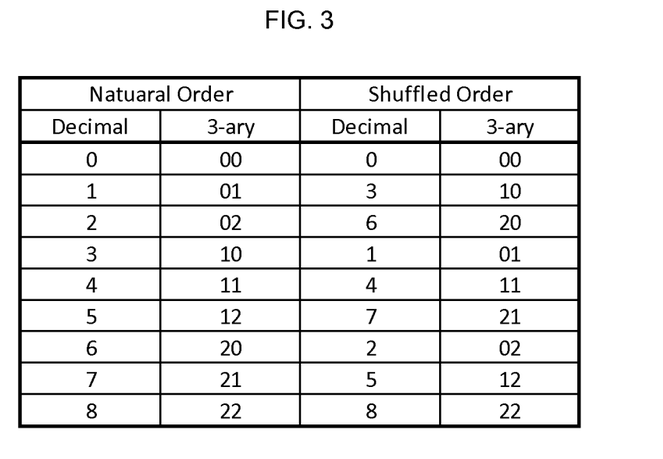
FIG. 3 illustrates reordering for a 9-point FFT using two stages of radix-3 butterflies.

In case of a single radix but non radix-2 implementations, such as radix-3, radix-4, radix-5, etc., the reordering of the shuffled signal may be realized by generalizing the bit-reversal operation to the digit-reversal operation. FIG. 3 shows the natural order and digit reversed order for a 9-point data signal when the FFT is performed using two radix-3 stages.

Mixed radix FFT is an FFT structure that uses a combination of two or more types of radixes. Hence reordering by bit reversing or digit reversing the index is no longer straightforward. Therefore, there is a need for a method for the reordering of a shuffled signal for an FFT structure that uses a combination of two or more types of radixes.

Figure 4:
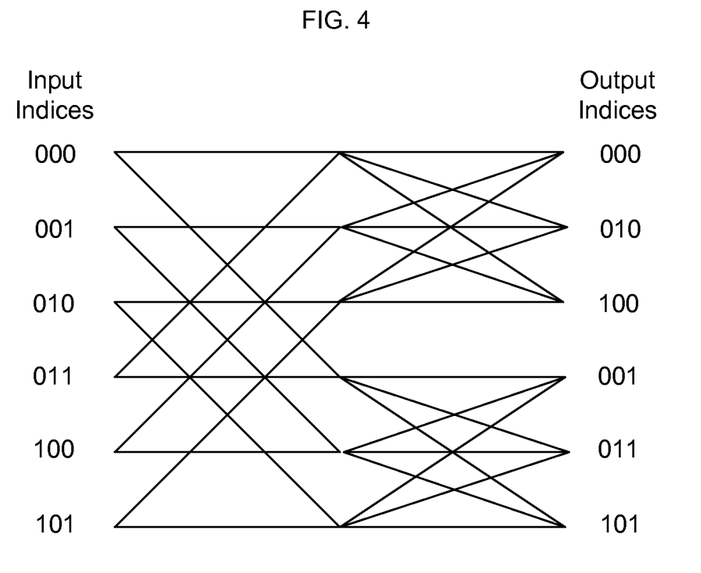
FIG. 4 illustrates 6-point FFT structure with radix-2 butterfly followed by radix-3 butterfly.
Figure 5:
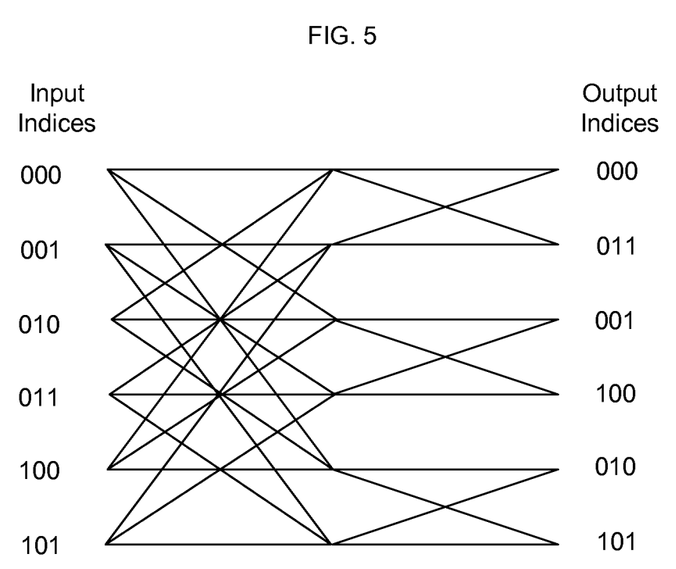
FIG. 5 illustrates an alternate 6-point FFT structure with radix-3 butterfly followed by radix-2 butterfly.

The reordering of a signal in case of mixed radix FFT may depend on the order in which the butterflies are arranged. For example, in case of a 6-point signal the shuffled indices for an FFT structure with radix-2 butterfly followed by a radix-3 butterfly are not the same for an FFT structure with radix-3 butterfly followed by a radix-2 butterfly as shown respectively in FIG. 4 and FIG. 5. Hence, the order in which the butterflies are arranged in an FFT structure also affects the reordering.

In some applications FFT for many different lengths of composite values may need to be computed. A single FFT structure may be desirable to support such variety of lengths. An explicit bit or digit reversal stage at the end of complete FFT may have a non-negligible impact on the complexity and latency. A method and apparatus are disclosed that enable low complexity and zero latency implementation for obtaining correct order signal at the output of the FFT.

SUMMARY

In accordance with an aspect of the present invention, a method for reordering an index of a data point in a signal output from a Fast Fourier Transform (FFT) performed on an input signal by an FFT structure using a number of radixes, wherein one of the radixes is of a type different from a type of another of the radixes, may include controlling, by a processing device, generating a reordered index for the data point in the signal output which is a natural order index of the data point in the signal output, in which the reordered index of the data point in the signal output is expressed using a base numbering convention as a J digit number, in which a value of J corresponds to the number of the radixes used in the FFT structure and in which each digit of the J digit number corresponds to a respective one radix of the radixes. The processing device may be configured as a base ripple counter including a plurality of stages corresponding respectively to the radixes of the FFT structure, wherein each of the stages corresponds to a mod-r counter of the base ripple counter, in which r is the radix of the stage. The mod-r counters may be arranged in a same order as an order in which the radixes are arranged in the FFT structure, and the mod-r counters may be connected asynchronously such that a trailing edge of a most significant output of a first mod-r counter of a first stage of the stages triggers a second mod-r counter of a second stage of the stages, the second stage being next in the order after the first stage. The reordered index for the data point in the signal output may have values respectively of the mod-r counters in the order of the mod-r counters, for the digits respectively of the J digit number.

In one alternative, the method may include controlling, by the processing device, clocking of the base ripple counter by a same clock used to control the FFT structure.

In one alternative, the reordered index for the data point in the signal output may be available when the data point in the signal output is available from the FFT structure.

In one alternative, a weight of a given digit in the reordered index, the given digit being other than a least significant digit in the reordered index, may be a product of a weight of a next least significant digit in the reordered index and a value of the radix corresponding to the next least significant digit, and a weight of the least significant digit in the reordered index is equal to one.

In one alternative, the method may include: determining, by the processing device, for each of the digits of the reordered index, a product of a value of the digit and the weight of the digit, and determining, by the processing device, a sum of the products, wherein the sum is a natural binary representation of an index value of the data point in the signal output.

In one alternative, the FFT structure may implement a Decimation-In-Time (DIT) method or a Decimation-In-Frequency (DIF) method.

In one alternative, when the FFT structure implements the Decimation-In-Time (DIT) method, the reordered index for the data point in the output signal may be for a signal output from a FFT butterfly operation.

In one alternative, when the FFT structure implements the DIF method, the reordered index for the data point in the output signal may be for a signal input to a FFT butterfly operation.

In accordance with an aspect of the present invention, an apparatus for reordering an index of a data point in a signal output from a fast fourier transform (FFT) performed on an input signal by an FFT structure using a number of radixes, wherein one of the radixes is of a type different from a type of another of the radixes, may include circuitry configured to control generating a reordered index for the data point in the signal output which is a natural order index of the data point in the signal output, in which the reordered index of the data point in the signal output is expressed using a base numbering convention as a J digit number, in which a value of J corresponds to the number of the radixes used in the FFT structure and in which each digit of the J digit number corresponds to a respective one radix of the radixes. The circuitry may be configured as a base ripple counter including a plurality of stages corresponding respectively to the radixes of the FFT structure, wherein each of the stages corresponds to a mod-r counter of the base ripple counter, in which r is the radix of the stage. The mod-r counters may be arranged in a same order as an order in which the radixes are arranged in the FFT structure, and the mod-r counters may be connected asynchronously such that a trailing edge of a most significant output of a first mod-r counter of a first stage of the stages triggers a second mod-r counter of a second stage of the stages, the second stage being next in the order after the first stage. The reordered index for the data point in the signal output may have values respectively of the mod-r counters in the order of the mod-r counters, for the digits respectively of the J digit number.

In one alternative of the apparatus, each of the stages may be configured by least one flip-flop.

In one alternative of the apparatus, clocking of the base ripple counter may be controlled by a same clock used to control the FFT structure.

In one alternative of the apparatus, a weight of a given digit in the reordered index, the given digit being other than a least significant digit in the reordered index, may be a product of a weight of a next least significant digit in the reordered index and a value of the radix corresponding to the next least significant digit, and a weight of the least significant digit in the reordered index is equal to one.

In one alternative of the apparatus, the circuitry may be configured to determine, for each of the digits of the reordered index, a product of a value of the digit and the weight of the digit, and the circuitry may be configured to determine a sum of the products, wherein the sum is a natural binary representation of an index value of the data point in the signal output.

In one alternative of the apparatus, the FFT structure may implement a Decimation-In-Time (DIT) method or a Decimation-In-Frequency (DIF) method.

In accordance with an aspect of the present invention, a wireless communication device may include a receiver to receive an input signal; and a processing device for reordering an index of a data point in a signal output from a fast fourier transform (FFT) performed on the input signal by an FFT structure using a number of radixes, wherein one of the radixes is of a type different from a type of another of the radixes. The processing device may be configured to control generating a reordered index for the data point in the signal output which is a natural order index of the data point in the signal output, in which the reordered index of the data point in the signal output is expressed using a base numbering convention as a J digit number, in which a value of J corresponds to the number of the radixes used in the FFT structure and in which each digit of the J digit number corresponds to a respective one radix of the radixes. In addition, the processing device may be configured as a base ripple counter including a plurality of stages corresponding respectively to the radixes of the FFT structure, wherein each of the stages corresponds to a mod-r counter of the base ripple counter, in which r is the radix of the stage. The mod-r counters may be arranged in a same order as an order in which the radixes are arranged in the FFT structure, and the mod-r counters may be connected asynchronously such that a trailing edge of a most significant output of a first mod-r counter of a first stage of the stages triggers a second mod-r counter of a second stage of the stages, the second stage being next in the order after the first stage. The reordered index for the data point in the signal output may have values respectively of the mod-r counters in the order of the mod-r counters, for the digits respectively of the J digit number.

In one alternative of the device, each of the stages may be configured by least one flip-flop.

In one alternative of the device, clocking of the base ripple counter may be controlled by a same clock used to control the FFT structure.

In one alternative of the device, a weight of a given digit in the reordered index, the given digit being other than a least significant digit in the reordered index, may be a product of a weight of a next least significant digit in the reordered index and a value of the radix corresponding to the next least significant digit, and a weight of the least significant digit in the reordered index is equal to one.

In one alternative of the device, the processing device may be configured to determine, for each of the digits of the reordered index, a product of a value of the digit and the weight of the digit, and the processing device may be configured to determine a sum of the products, wherein the sum is a natural binary representation of an index value of the data point in the signal output.

In one alternative of the device, the FFT structure may implement a Decimation-In-Time (DIT) method or a Decimation-In-Frequency (DIF) method.

DETAILED DESCRIPTION

The foregoing aspects, features and advantages of the present invention will be further appreciated when considered with reference to the following description of preferred embodiments and accompanying drawings, wherein like reference numerals represent like elements. In describing the preferred embodiments of the invention illustrated in the appended drawings, specific terminology will be used for the sake of clarity. However, the aspects of the invention are not intended to be limited to the specific terms used.

A pipeline FFT may be controlled using a simple counter as described in "A new approach to pipeline FFT processor," by Shousheng, He and Torkelson, M., in Proceedings of 10th International Parallel Processing Symposium, April 1996.

Figure 6:
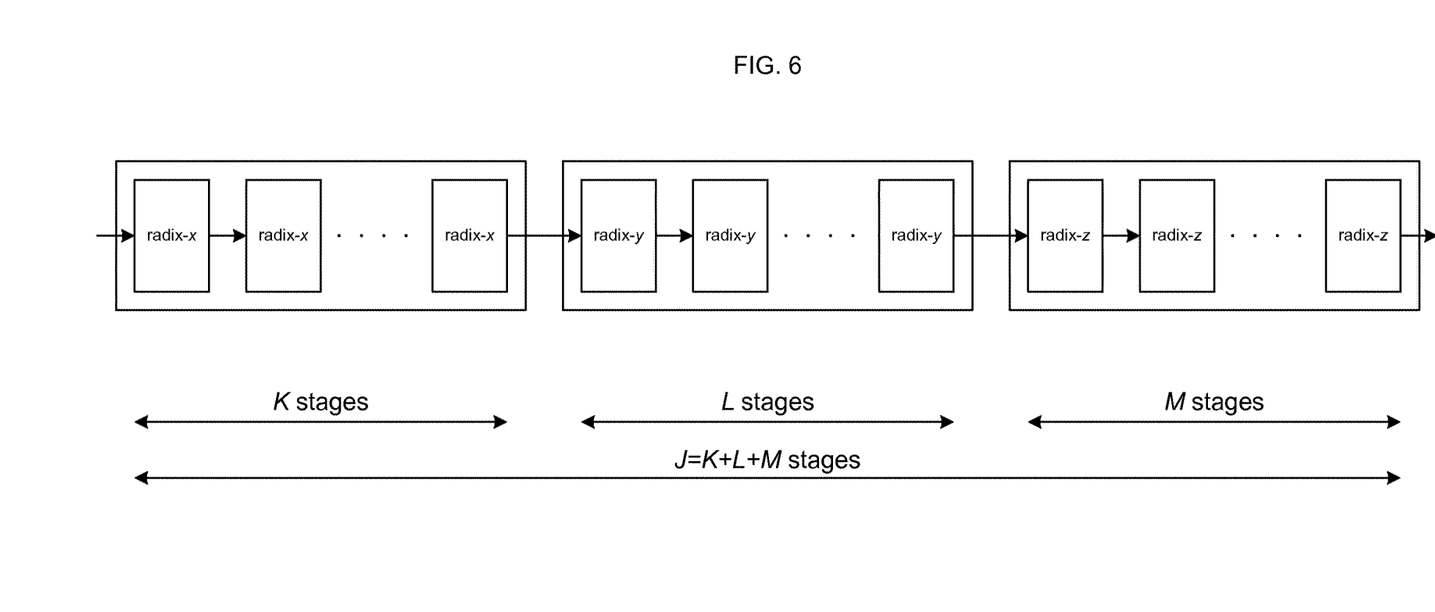
FIG. 6 illustrates a general FFT structure comprising multiple stages of three different radixes.

A mixed radix pipeline FFT structure of J stages realized with K radix-x stages followed by L radix-y stages which is in turn followed by M radix-z stages is used for illustration and shown in FIG. 6. The indices of each data point in a signal may be expressed in two new numbering conventions called base-xyz numbering convention and base-zyx numbering convention. It may also be possible to express the indices in other numbering conventions such as base-yxz or base-zxy. The chosen order may depend on the order in which the different radix butterflies are arranged in a particular mixed radix FFT structure. Although the aspects of the invention are illustrated for a mix of three different radixes, the aspects of the invention may be applicable to any number of mixed radixes.

Figure 7:
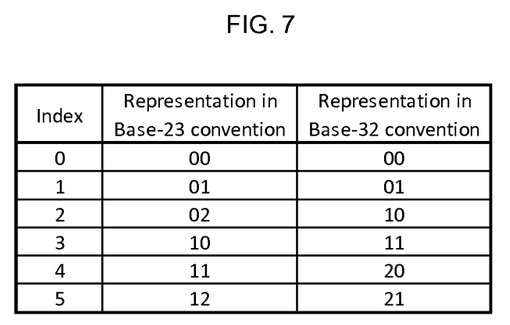
FIG. 7 illustrates reordering for a 6-point FFT when using two different numbering conventions.

As an example, for a 6 point FFT only two different radixes are possible. Hence, they may be expressed in base-23 and base-32 numbering conventions with one radix-2 and one radix-3 butterfly stage. For the FFT structure shown in FIG. 4, the indices are expressed in base-23 number convention and for the FFT structure shown in FIG. 5, the indices are expressed in base-32 number convention. The mapping of the normal decimal indices to the base-23 and base-32 numbering conventions are summarized in the table contained FIG. 7.

Figure 8:
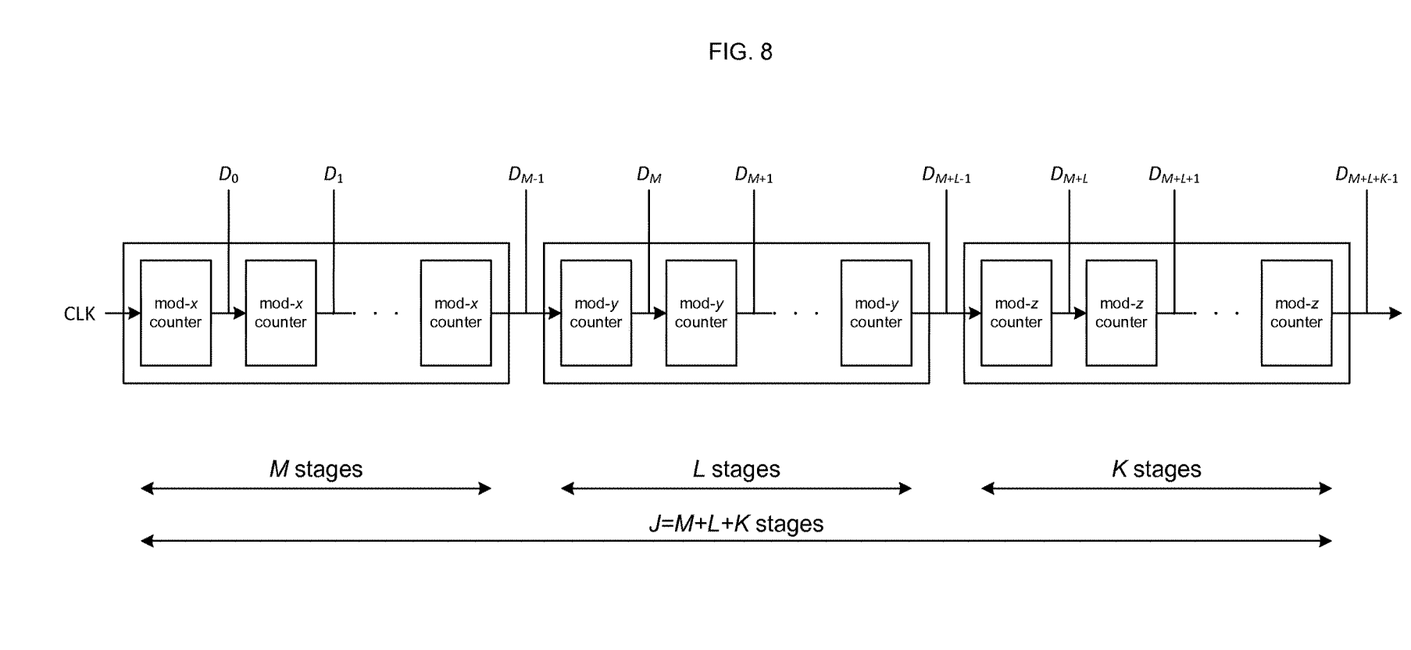
FIG. 8 illustrates a reordering ripple counter circuit for mixed radix FFT according the aspects of the present invention.

According to an aspect of the present invention, a base-xyz ripple counter may be used to represent an index in a base-xyz numbering convention as shown in FIG. 8. Each stage of the base-xyz ripple counter uses a mod-r counter where r is the radix of that stage in the FFT structure shown in FIG. 6. All the mod-r counters are connected in an asynchronous manner such that the trailing edge of the output from the most significant (left most) flip-flop of a stage may trigger the mod-r counter of the next stage. This forms a base-xyz ripple counter which may provide the natural order index of the data point in a signal. According to an aspect of the present invention the ripple counter may be clocked by the same clock that provides the control for the entire FFT structure. According to this aspect when the output from the final stage of the FFT is ready, the required natural order index for that output may also be ready at the output of the ripple counter.

In the case where the FFT structure has M radix-z stages followed by L radix-y stages which is again followed by K radix-x stages, the design of the ripple counter may be in reverse order which forms a base-zyx ripple counter. The digit reversal of indices in base-xyz convention provides the reordered index in base-zyx convention and vice versa.

Figure 9:
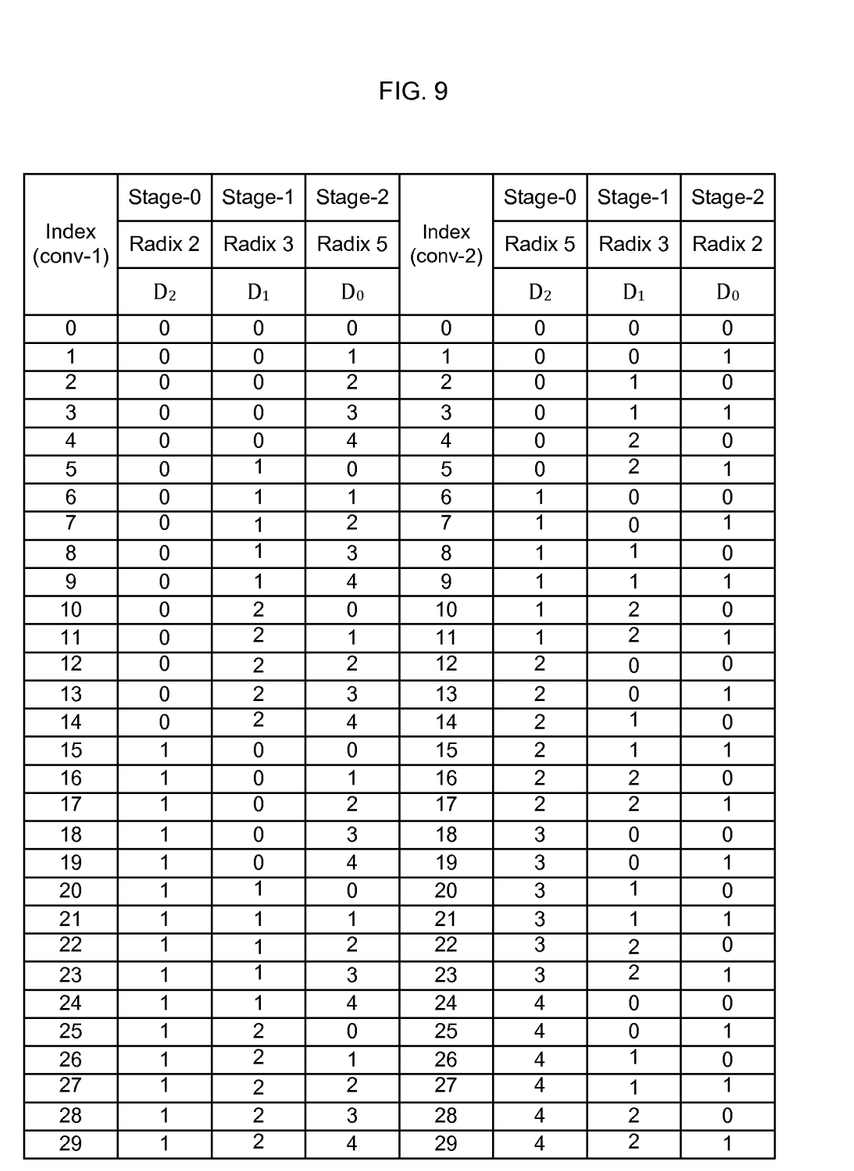
FIG. 9 illustrates indexing according to base-235 and base-532 numbering conventions according the aspects of the present invention.
Figure 10:
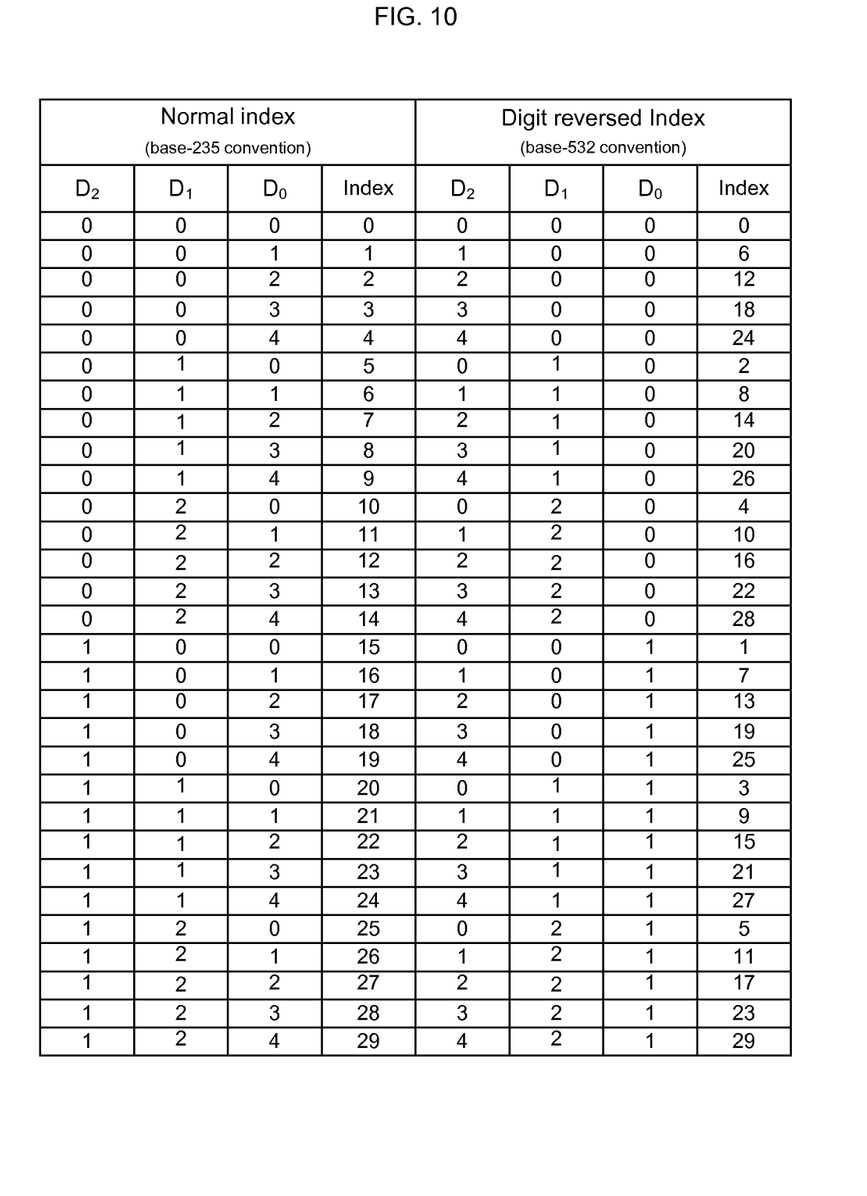
FIG. 10 illustrates index reordering from base-235 to base-532 numbering convention according the aspects of the present invention.

The normal indices generated by a base-xyz ripple counter and a base-zyx ripple counter for an example of 30 point FFT with one radix-2 stage, one radix-3 stage and one radix-5 stage are shown in the table contained in FIG. 9. The normal indices generated by a base-xyz ripple counter when there is digit reversal provides the reordered indices in base-zyx number convention as shown in the table contained in FIG. 10.

In a more general case, an arbitrary number of stages for each radix may be used in a mixed radix FFT structure. An example of this is described for the case of a mixed radix FFT structure comprising three different radixes with a different number of stages for each radix. An index in a base-xyz convention is a J digit number with M least significant digits of base-z, the next L digits of base-y and the remaining K digits of base-x. In a base-zyx convention it has K least significant digits of base-x, the next L digits of base-y and the remaining M digits of base-z. For example, consider a length N=360 point signal which can be decomposed into a smaller length signal of three different bases: 2, 3 and 5. Specifically, $360=2^3*3^2*5^1$. Therefore, the mixed radix structure comprises three different radixes 2, 3, and 5 with three stages of radix-2, two stages of radix-3 and one stage of radix-5 and the total number of stages is J=6. Therefore, the index in a base-235 convention for N=360 is J=6 digits long with first M=3 digits in base-2, next L=2 digits in base-3 and the last K=1 digit following base-5 convention.

Figure 11:
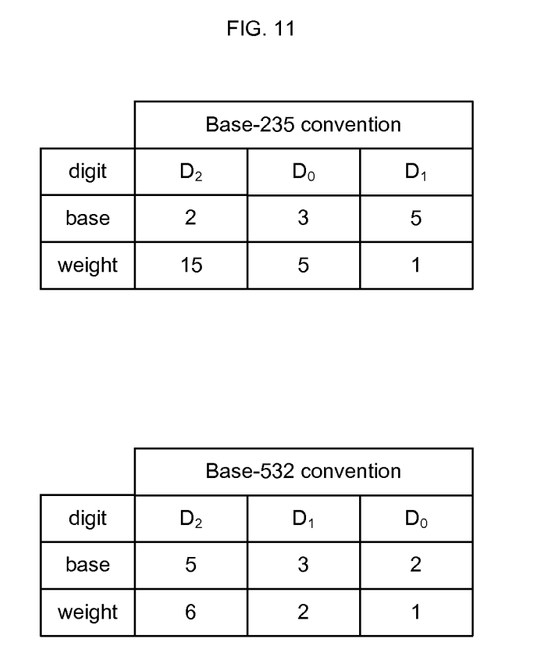
FIG. 11 illustrates the weight for each digit for computing decimal or binary index from a base-235 or base-532 numbering convention for length N=30.
Figure 12:
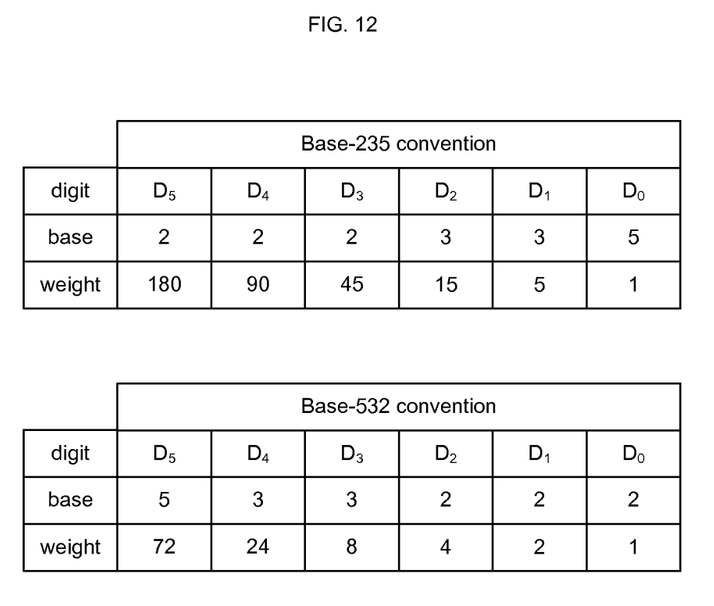
FIG. 12 illustrates the weight for each digit for computing decimal or binary index from a base-235 or base-532 numbering convention for length N=360.
Figure 13:
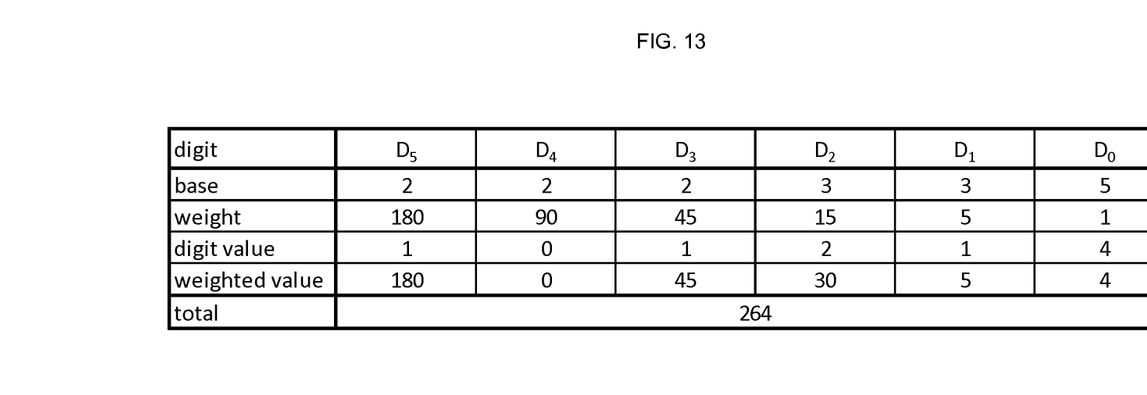
FIG. 13 illustrates an example of decimal index mapping to an index for a base-235 numbering convention for length N=360.

Similar to conventional decimal numbering system (base-10), each digit in the convention according to aspects of the present invention has a weight or place value. In the decimal system, the least significant digit has the weight of $10^0$, i.e., unity. The next significant bit has the place value of $10^1=10$, and the next significant bit has the place value of $10^2=100$, and so on. Similarly, in the mixed radix convention, the weight of a digit in a particular position in a number is equal to the product of the weight of the next least significant digit and the base or radix of that digit. The weight of the least significant digit is always one regardless of the radix. An example of this is shown in FIG. 11 for a base-235 and base-532 convention with one stage of each radix type for length $N=30=2^1*3^1*5^1$. Another example of this is shown in FIG. 12 for a base-235 and base-532 convention with a different number of stages for each radix type for length $N=360=2^3*3^2*5^1$. A decimal index of 264 for a length N=360 may be represented in a base-235 convention as J=6 digit number "101214" as illustrated in FIG. 13. According to an aspect of the present invention, the sum of all products of a digit value and its corresponding weight for the respective digits of the J digit number provides the index in a natural binary representation which may be used for indexing a memory location to access a signal in its natural order.

For the described mixed radix FFT structure, the natural index is expressed in base-xyz convention and so the reordered index has to be decoded from base-zyx convention. The base and weight of the digits of an index for a 30 point FFT is shown in the table contained in FIG. 10.

According to an aspect of the present invention, when DIF algorithm is used, the reordered index generated as described by using a base-xyz ripple counter provides the correct index of the output data point in a signal. When DIT algorithm is used the base-zyx ripple counter may be used. In this case the reordered index generated by using base-zyx ripple counter may provide the index of the input data point in a signal that has to be fetched from the memory for butterfly operation.

According to another aspect of the invention the ripple counters may be configurable to be any modulo operation. This enables the counter to adapt to the particular radix used in each stage of the FFT structure.

According to an aspect of the invention, the ripple counter may be used for generating the reordered index for any combination of mixed radix supported by the FFT structure to which the ripple counter is associated.

The present invention offers reduced hardware complexity and zero latency. It may be extended for any combination of radixes arranged in any order in a mixed radix FFT structure.

The aspects of the present invention for index reordering are applicable in any field where FFTs are used. It is particularly well suited for real time FFT architectures with mixed radixes such as in case of the 3rd Generation Partnership Project (3GPP) Long Term Evolution (LTE) wireless communication system.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims. Aspects of each embodiment may be employed in the other embodiments described herein.

Aspects of the present invention may be implemented in firmware of a micro-processor or micro-controller. In another alternative, aspects of the present invention may also be implemented as a combination of firmware and hardware. The hardware may be an application specific integrated circuit (ASIC), field programmable gate array (FPGA), discrete logic components or any combination of such devices.

The consumer electronics devices that may use the aspects of the present invention may include smartphones, tablets, laptops, gaming consoles, cameras, video camcorders, TV, car entertainment systems, etc. The infrastructure devices that may use the aspects of the present invention may include the base stations of wireless communication systems, where the base stations include a receiver for receiving and a transmitter for transmitting wireless communication signals, other signal and image processing systems, OFDM based modulation and demodulation systems, etc.

The invention claimed is:

1. A method for reordering an index of a data point in a signal output from a Fast Fourier Transform (FFT) performed on an input signal by an FFT structure using a number of radix stages, wherein one of the radix stages is of a radix type different from a radix type of another of the radix stages, the method comprising:

generating, by a processing device, a reordered index for the data point in the signal output which is a natural order index of the data point in the signal output, in which the reordered index of the data point in the signal output is expressed using a base numbering convention as a base number having J digits, in which a value of J corresponds to a total number of the radix stages used in the FFT structure and in which each digit of the base number corresponds to a respective one radix stage of the radix stages, wherein the processing device is configured as a base ripple counter including a plurality of stages corresponding respectively to the radix stages of the FFT structure, wherein each of the stages corresponds to a mod-r counter of the base ripple counter, in which r is the radix of the corresponding radix stage in the FFT structure, and wherein the mod-r counters are arranged in a same order as an order in which the radix stages are arranged in the FFT structure, wherein the mod-r counters are connected asynchronously such that a trailing edge of a most significant output of a first mod-r counter of a first stage of the stages triggers a second mod-r counter of a second stage of the stages, the second stage being next in the order after the first stage, wherein the reordered index for the data point in the signal output has values respectively of the mod-r counters in the order of the mod-r counters, for the digits respectively of the base number, and wherein the generating of the reordered index is started before the FFT on the input signal by the FFT structure is completed.

2. The method of claim 1, further comprising:
clocking, by the processing device, the base ripple counter by a same clock used to control the FFT structure.

3. The method of claim 2, wherein the reordered index for the data point in the signal output is available when the data point in the signal output is available from the FFT structure.

4. The method of claim 1,
wherein a weight of a given digit in the reordered index, the given digit being other than a least significant digit in the reordered index, is a product of a weight of a next least significant digit in the reordered index and a value of the radix corresponding to the next least significant digit, and
wherein a weight of the least significant digit in the reordered index is equal to one.

5. The method of claim 4 further comprising:
determining, by the processing device, for each of the digits of the reordered index, a product of a value of the digit and the weight of the digit, and
determining, by the processing device, a sum of the products, wherein the sum is a natural binary representation of an index value of the data point in the signal output.

6. The method of claim 1, wherein the FFT structure implements a Decimation-In-Time (DIT) method or a Decimation-In-Frequency (DIF) method.

7. The method of claim 6, wherein, when the FFT structure implements the Decimation-In-Time (DIT) method, the reordered index for the data point in the output signal is for a signal output from a FFT butterfly operation.

8. The method of claim 6, wherein, when the FFT structure implements the DIF method, the reordered index for the data point in the output signal is for a signal input to a FFT butterfly operation.

9. An apparatus for reordering an index of a data point in a signal output from a Fast Fourier Transform (FFT) performed on an input signal by an FFT structure using a number of radix stage, wherein one of the radix stages is of a radix type different from a radix type of another of the radix stages, the apparatus comprising:
circuitry configured to generate a reordered index for the data point in the signal output which is a natural order index of the data point in the signal output, in which the reordered index of the data point in the signal output is expressed using a base numbering convention as a base number having J digits, in which a value of J corresponds to a total number of the radix stages used in the FFT structure and in which each digit of the base number corresponds to a respective one radix stage of the radix stages,
wherein the circuitry is configured as a base ripple counter including a plurality of stages corresponding respectively to the radix stages of the FFT structure,
wherein each of the stages corresponds to a mod-r counter of the base ripple counter, in which r is the radix of the corresponding radix stage in the FFT structure, and wherein the mod-r counters are arranged in a same order as an order in which the radix stages are arranged in the FFT structure,
wherein the mod-r counters are connected asynchronously such that a trailing edge of a most significant output of a first mod-r counter of a first stage of the stages triggers a second mod-r counter of a second stage of the stages, the second stage being next in the order after the first stage,
wherein the reordered index for the data point in the signal output has values respectively of the mod-r counters in the order of the mod-r counters, for the digits respectively of the base number, and
wherein the circuitry is configured to start to generate the reordered index before the FFT on the input signal by the FFT structure is completed.

10. The apparatus of claim 9,
wherein each of the stages is configured by least one flip-flop.

11. The apparatus of claim 9,
wherein clocking of the base ripple counter is by a same clock used to control the FFT structure.

12. The apparatus of claim 9,
wherein a weight of a given digit in the reordered index, the given digit being other than a least significant digit in the reordered index, is a product of a weight of a next least significant digit in the reordered index and a value of the radix corresponding to the next least significant digit, and
wherein a weight of the least significant digit in the reordered index is equal to one.

13. The apparatus of claim 12,
wherein the circuitry is configured to determine, for each of the digits of the reordered index, a product of a value of the digit and the weight of the digit, and
wherein the circuitry is configured to determine a sum of the products, wherein the sum is a natural binary representation of an index value of the data point in the signal output.

14. The apparatus of claim 9, wherein the FFT structure implements a Decimation-In-Time (DIT) method or a Decimation-In-Frequency (DIF) method.

15. A wireless communication device comprising:
a receiver to receive an input signal; and
a processing device for reordering an index of a data point in a signal output from a Fast Fourier Transform (FFT) performed on the input signal by an FFT structure using a number of radix stages, wherein one of the radix stages is of a radix type different from a radix type of another of the radix stages,
where the processing device is configured to generate a reordered index for the data point in the signal output which is a natural order index of the data point in the signal output, in which the reordered index of the data point in the signal output is expressed using a base numbering convention as a base number having J digits, in which a value of J corresponds to a total number of the radix stages used in the FFT structure and in which each digit of the base number corresponds to a respective one radix stage of the radix stages,
wherein the processing device is configured as a base ripple counter including a plurality of stages corresponding respectively to the radix stages of the FFT structure,
wherein each of the stages corresponds to a mod-r counter of the base ripple counter, in which r is the radix of the corresponding radix stage in the FFT structure, and wherein the mod-r counters are arranged in a same order as an order in which the radix stages are arranged in the FFT structure,
wherein the mod-r counters are connected asynchronously such that a trailing edge of a most significant output of a first mod-r counter of a first stage of the stages triggers a second mod-r counter of a second stage of the stages, the second stage being next in the order after the first stage,
wherein the reordered index for the data point in the signal output has values respectively of the mod-r counters in the order of the mod-r counters, for the digits respectively of the base number, and wherein the processing device is configured to start to generate the reordered index before the FFT on the input signal by the FFT structure is completed.

16. The device of claim 15, wherein each of the stages is configured by least one flip-flop.

17. The device of claim 15, wherein clocking of the base ripple counter is by a same clock used to control the FFT structure.

18. The device of claim 15, wherein a weight of a given digit in the reordered index, the given digit being other than a least significant digit in the reordered index, is a product of a weight of a next least significant digit in the reordered index and a value of the radix corresponding to the next least significant digit, and wherein a weight of the least significant digit in the reordered index is equal to one.

19. The device of claim 18, wherein the processing device is configured to determine, for each of the digits of the reordered index, a product of a value of the digit and the weight of the digit, and wherein the processing device is configured to determine a sum of the products, wherein the sum is a natural binary representation of an index value of the data point in the signal output.

20. The device of claim 19, wherein the FFT structure implements a Decimation-In-Time (DIT) method or a Decimation-In-Frequency (DIF) method.

* * * * *